United States Patent [19]

Marcham et al.

[11] 4,316,945
[45] Feb. 23, 1982

[54] BUTTON CELL ELECTRODE AND METHOD OF MANUFACTURE

[75] Inventors: Douglas H. Marcham, Crewkerne; Kenneth A. Reichter, Bridport, both of England

[73] Assignee: Varta Limited, Crewkerne, England

[21] Appl. No.: 183,421

[22] Filed: Sep. 2, 1980

[30] Foreign Application Priority Data

Oct. 4, 1979 [GB] United Kingdom ............ 34384/79

[51] Int. Cl.³ .................. H01M 4/76; H01M 4/04
[52] U.S. Cl. .......................... 429/222; 429/223; 429/239; 29/623.1
[58] Field of Search ............. 429/218, 220, 223, 239, 429/222, 219, 209, 174, 162, 233; 29/623.1

[56] References Cited

U.S. PATENT DOCUMENTS

| 509,270 | 11/1893 | Usher | 429/239 |
| 1,140,403 | 5/1915 | Schoenmehl | 429/220 |
| 2,768,229 | 10/1956 | Herbert | 136/107 |
| 3,353,998 | 11/1967 | Langguth et al. | 429/239 |
| 3,483,043 | 12/1969 | Steffens | 136/166 |

FOREIGN PATENT DOCUMENTS

| 1518487 | 2/1968 | France . | |
| 55-48007 | 7/1980 | Japan | 429/223 |
| 15952 | of 1904 | United Kingdom | 429/239 |

Primary Examiner—Donald L. Walton
Attorney, Agent, or Firm—Burmeister, York, Palmatier, Hamby & Jones

[57] ABSTRACT

A mass plate electrode comprises a tablet of active material in a container of nickel gauze. The container consists of a cup and a lid which are joined by overlapping peripheral closure portions which are pressed into abutting attachment with each other to form an annular rim which is then bent over so as to embrace the sidewall portion of the cup.

Prior to bending the rim over, the abutting closure portions of the cup and the lid are subjected to planishing or swaging to reduce the combined thickness of the two abutting closure portions by one half.

14 Claims, 9 Drawing Figures

BUTTON CELL ELECTRODE AND METHOD OF MANUFACTURE

TECHNICAL FIELD OF THE INVENTION

The invention relates to mass plate electrodes for button cells and methods of making the electrodes.

A particular, but in no sense limiting, application of the invention is to sealed nickel cadmium cells.

The term mass plate electrode is a conventional term used in the art to describe an electrode in which the active material is in the form of a mass surrounded by a liquid-permeable sheet of metallic material such as metal gauze or metal mesh.

BACKGROUND ART

Mass plate electrodes for button cells are presently manufactured by placing a tablet formed of pressed active material powder in a cup of nickel gauze, placing a lid of nickel gauze within the cup, over the tablet, and then folding over the upper peripheral edge portion of the cup inwardly through 90° towards the cup centre to retain the peripheral portion of the lid between the closure portion of the cup thus formed and the tablet of active material. The assembly is then pressed between a punch and die to obtain the final size and shape of the electrode.

Thus, according to conventional practice, a mass plate electrode, for a button cell, comprises a mass of active material having first and second main surfaces and a side surface interconnecting the first and second main surfaces; a cup of liquid-permeable metal sheet having a base portion adjacent the first main surface of the mass, a side wall portion adjacent the side surface of the mass, and a peripheral closure portion; and a lid having an inner portion adjacent the second main surface of the mass, and a peripheral closure portion held by the peripheral closure portion of the cup.

One disadvantage of this known electrode construction is that due to the necessity of placing the tablet of active material and the lid inside the cup, this method of manufacture is difficult to automate. Moreover, when the cup and the lid are formed from metal gauze or mesh, it is difficult to carry out punching of the gauze or mesh without the formation of strands or whiskers which protrude from the cut edges and, at a later stage in the manufacture of the botton cell, these whiskers can cause short circuits with other electrodes of the cell.

DISCLOSURE OF THE INVENTION

It is an object of the invention to provide an improved construction of a mass plate electrode which enables the disadvantages of the prior art to be overcome.

This object is achieved by bending the peripheral closure portions so that they embrace the side wall portion of the cup.

Thus, according to the invention, a mass plate electrode for a button cell, comprises a mass of active material having first and second main surfaces and a side surface interconnecting the first and second main surfaces; a cup of liquid-permeable metal sheet having a base portion adjacent the first main surface of the mass, a side wall portion adjacent the side surface of the mass, and a peripheral closure portion; and a lid of liquid-permeable metal sheet having an inner portion adjacent the second main surface of the mass and a peripheral closure portion attached to the peripheral closure portion of the cup, the attached peripheral closure portions of the cup and the lid being bent so as to embrace the side wall portion of the cup.

The invention also provides a method of making a mass plate electrode, for a button cell, comprising the steps of making a mass of active material having first and second main surfaces and a side surface interconnecting the main surfaces; punching liquid-permeable metal sheet to form a cup having a base portion, a side wall portion and a peripheral closure portion, and to form a lid having an inner portion and a peripheral closure portion; placing the mass within the cup so that the first main surface of the mass is adjacent the base portion of the cup and the side surface of the mass is adjacent the side wall portion of the cup; securing the mass within the cup by placing the lid so that the central portion of the lid is adjacent the second main surface of the mass, pressing the peripheral closure portions of the cup and the lid into abutting attachment with each other and bending the abutting closure portions so that they embrace the side wall portion of the cup.

Thus, in the manufacture of conventional mass plate electrodes in which the first and second main surfaces of the mass are parallel planar surfaces and the side surface of the mass is a cylindrical band, the cup and the lid can be punched from planar sheet material so that the peripheral closure portion of the cup extends radially outwards from the side wall in the form of a planar flange which is parallel to the base portion of the cup. Similarly, the peripheral closure portion of the lid may comprise an annular outer portion of the lid. This facilitates the introduction of the mass into the cup and completely obviates the need to introduce the lid into the cup, as in the prior known methods of manufacture. The lid is attached to the cup merely by placing it on top of the cup, so that the peripheral closure portions of the lid and the cup overlap each other, and then pressing these overlapping portions into abutting attachment.

Where the cup and the lid are punched from metal gauze or mesh, the abutting closure portions can be subjected to a swaging or planishing operation to form a rim having a thickness which is less than the combined thickness of two layers of metal gauze or mesh so that when the rim is bent so as to embrace the side wall of the cup, it does not significantly increase width of the cup. Indeed, where peripheral closure portions of the cup and the lid are punched from metal gauze or mesh of the same thickness it is possible to reduce the combined thickness of the overlapping peripheral closure portions by substantially one half.

After completion of the swaging or planishing operation it is possible to trim the edge of the rim to thereby remove unwanted strands or whiskers simultaneously from the punched edges of the cup and the lid, before bending the rim through 90° into its final position.

An embodiment of the invention is hereinafter described, by way of example, with reference to the accompanying drawings.

BEST MODE FOR CARRYING OUT THE INVENTION

Figure 1:
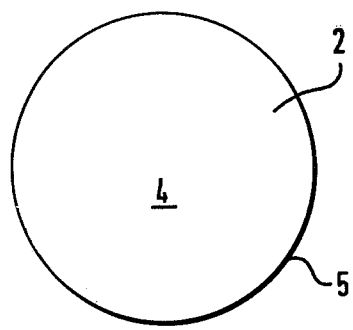
FIGS. 1 and 2 are a plan view and a cross-sectional elevation of a mass of active material of an electrode according to the invention.
Figure 2:
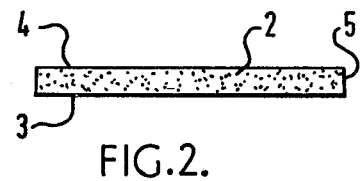

A mass of active material for an electrode 1 is in the form of a flat cylindrical tablet or pastille 2 obtained by known methods by compressing a powder of the active material and having first and second main surfaces 3 and 4, which are circular in shape, and a cylindrical side surface 5.

A container 15 for the electrode 1 is formed of nickel gauze or nickel mesh and comprises a cup 6 having a sidewall portion 8 and an annular peripheral closure portion 9, and a circular lid 10 having a diameter corresponding to the outer diameter of the closure portion 9 of the cup 6. The lid 10 has a circular inner portion 12, having the same size as the main surfaces 3 and 4 of the table 2, and an annular peripheral closure portion 11, having the same size as the peripheral closure portion 9 of the cup 6.

In one method of manufacture, both the cup 6 and the lid 10 are punched out as one piece from nickel gauze strip and are interconnected by a narrow web to permit subsequent folding of the lid 10 over the cup 6. However, as shown, the cup 6 and the lid 10 are preferably punched out separately and formed automatically in automatic machinery fed with continuous strips of nickel gauze.

Figure 3:
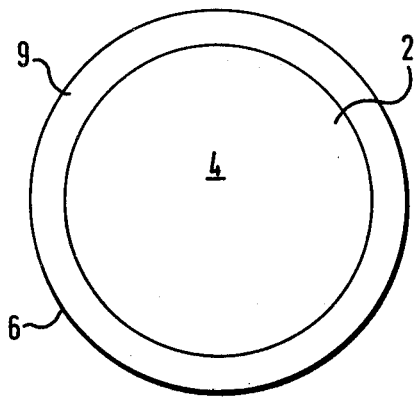
FIGS. 3 and 4 are a plan view and a cross-sectional elevation of a cup forming part of an electrode container and accommodating the mass shown in FIGS. 1 and 2.
Figure 4:
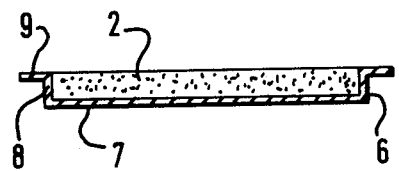
Figure 5:
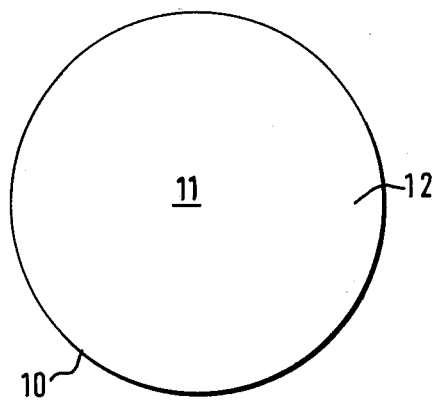
FIG. 5 is a plan view of a lid of the electrode container.

In manufacture of the electrode 1, the tablet 2 is placed in the cup 6 and the dimensions of the tablet 2 and the cup 6 are interrelated so that the tablet 2 is a slide fit in the cup 6. This stage of the manufacture is shown in FIGS. 3 and 4.

In the next stage of manufacture, the lid 10 is placed above the cup 6 and the assembly is pressed so as to ensure that the nickel gauze of the base portion 7 of the cup 6 and the inner portion 11 of the lid 10 are at least partially embedded in the first and second main surfaces 3 and 4 of the tablet 2, respectively.

Figure 6:
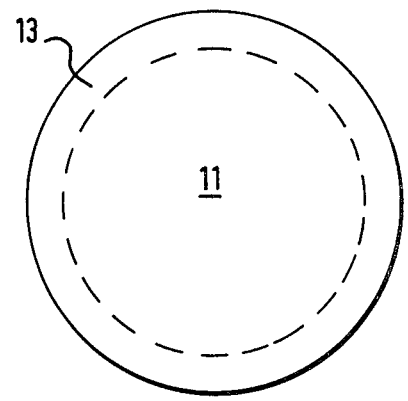
FIGS. 6 and 7 are a plan view and a cross-sectional elevation of the electrode at a stage in its manufacture after the lid shown in FIG. 5 has been placed on top of the sub-assembly shown in FIGS. 3 and 4.
Figure 7:
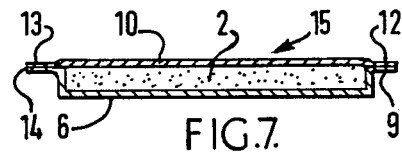

In the next stage of manufacture, shown in FIGS. 6 and 7, the overlapping peripheral closure portions 9 and 12 of the cup 6 and the lid 10 are pressed into abutting attachment to form an annular rim 13 having an outer edge 14 and this rim 13 is subjected to a planishing or swaging operation to reduce its thickness to less than the combined thickness of the two closure portions 9 and 11. Advantageously, the planishing or swaging operation reduces this combined thickness by one half. Also, the outer edge 14 is trimmed, if necessary, to obtain the correct size and to remove any unwanted strands or whiskers. These operations can be performed in sequence so that the performance of one operation contributes to the performance of the next operation.

Figure 8:
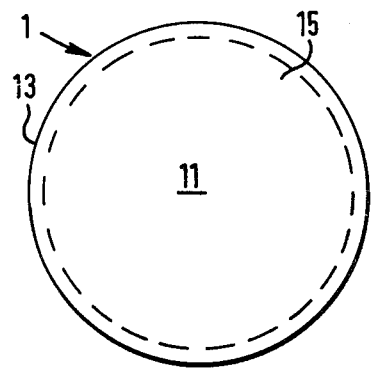
FIGS. 8 and 9 are a plan view and a cross-sectional elevation of the completed electrode.
Figure 9:
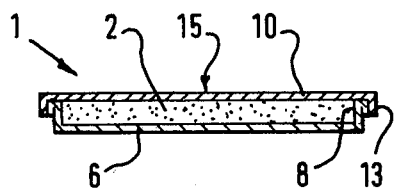

In the next manufacturing stage of the electrode, shown in FIGS. 8 and 9, the rim 13 is bent or folded-over through 90° to form a band embracing the sidewall portion 8 of the cup 6. The apparatus for bending or folding the rim 13 preferably includes a die through which the electrode 1 is pressed, to fold over the rim 13, as the electrode 1 is ejected from the apparatus.

We claim:

1. A mass plate electrode for a button cell comprising:
    (a) a mass of active material having first and second surfaces and a side surface interconnecting the first and second main surfaces;
    (b) a cup of liquid-permeable metal sheet having a base portion adjacent the first main surface of the mass, a side-wall portion adjacent the side surface of the mass and a peripheral closure portion;
    (c) a lid having an inner portion adjacent the second main surface of the mass and a peripheral closure portion held by the peripheral closure portion of the cup; and
    (d) the peripheral closure portions of the cup and the lid being bent so as to embrace the side wall portion of the cup.

2. An electrode according to claim 1, wherein the cup and the lid consist of metal gauze or mesh.

3. An electrode according to claim 2, wherein the peripheral closure portions are swaged or planished together to form a rim having a thickness which is less than the combined thickness of two layers of the metal gauze or mesh.

4. An electrode according to claim 2, wherein the base portion of the cup is at least partially embedded in the first main surface of the mass.

5. An electrode according to claim 2, wherein the inner portion of the lid is embedded in the second main surface of the mass.

6. An electrode according to claim 1, wherein the mass of active material is a tablet or pastille formed by pressing powdered active material.

7. A nickel-cadmium button cell including at least one electrode according to claim 1.

8. A method of making a mass plate electrode for a button cell, comprising the steps of:
    (a) making a mass of active material having first and second main surfaces and a side surface inter-connecting the first and second main surfaces;
    (b) punching liquid-permeable metal sheet to form a cup having a base portion, a side-wall portion and a peripheral closure portion, and to form a lid having an inner portion and a peripheral closure portion;
    (c) placing the mass within the cup so that the first main surface of the mass is adjacent the base portion of the cup and the side surface of the mass is adjacent the side-wall portion of the cup;
    (d) securing the mass within the cup by placing the lid so that the inner portion of the lid is adjacent the second main surface of the mass and pressing the peripheral closure portions of the cup and the lid into abutting attachment with each other; and
    (e) bending the abutting closure portions of the cup and the lid so as to embrace the side-wall portion of the cup.

9. A method according to claim 8, wherein the cup and the lid are punched from metal gauze or mesh.

10. A method according to claim 9, wherein the abutting closure portions are subjected to a swaging or planishing operation to form a rim having an edge and a thickness which is less than the thickness of two layers of metal gauze or mesh, before being bent so as to embrace the side-wall of the cup.

11. A method according to claim 10, wherein the edge of the rim is trimmed after the swaging or planishing operation.

12. A method according to claim 9, wherein the base portion of the cup is pressed so as to be at least partially embedded in the first main surface of the mass.

13. A method according to claim 9, wherein the inner portion of the lid is pressed so as to be at least partially embedded in the second main surface of the mass.

14. A method according to claim 8, wherein the said mass of active material is formed by pressing a powder of the active material into a tablet or pastille.

* * * * *